US010668828B2

(12) United States Patent
Wang et al.

(10) Patent No.: US 10,668,828 B2
(45) Date of Patent: Jun. 2, 2020

(54) MULTI-COIL CHARGING SYSTEM FOR DISTRIBUTED IN-WHEEL MOTORS

(71) Applicant: Toyota Motor Engineering & Manufacturing North America, Inc., Erlanger, KY (US)

(72) Inventors: Chi-Ming Wang, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 155 days.

(21) Appl. No.: 15/703,886

(22) Filed: Sep. 13, 2017

(65) Prior Publication Data
US 2019/0077269 A1   Mar. 14, 2019

(51) Int. Cl.
| B60L 53/12 | (2019.01) |
| B60L 53/30 | (2019.01) |
| H02J 50/10 | (2016.01) |
| H02J 7/00  | (2006.01) |
| H04B 5/00  | (2006.01) |
| H02J 7/02  | (2016.01) |

(52) U.S. Cl.
CPC ............... *B60L 53/12* (2019.02); *B60L 53/30* (2019.02); *H02J 7/0013* (2013.01); *H02J 7/025* (2013.01); *H02J 50/10* (2016.02); *H04B 5/0037* (2013.01); *H04B 5/0087* (2013.01)

(58) Field of Classification Search
None
See application file for complete search history.

(56) References Cited

U.S. PATENT DOCUMENTS

| 8,466,654 B2 | 6/2013 | Cook et al. |
| 9,090,170 B2 | 7/2015 | Mashinsky et al. |

(Continued)

FOREIGN PATENT DOCUMENTS

| WO | WO2012/136303 | 10/2012 |
| WO | WO2013/127445 | 9/2013 |

OTHER PUBLICATIONS

Inductive Charging; Wikipedia; printed date Sep. 12, 2017 (10 pages).

(Continued)

*Primary Examiner* — Robert Grant
*Assistant Examiner* — Tynese V McDaniel
(74) *Attorney, Agent, or Firm* — Snell & Wilmer LLP

(57) ABSTRACT

Methods, systems, and devices for inductively charging a vehicle. The inductive charging system includes multiple inductive coils for receiving a wireless transferred power. The inductive charging system includes a power electronics circuit that converts the wireless transferred power to a DC current and one or more power storage devices for storing the electrical energy by charging the one or more power storage devices using the DC current. The inductive charging system includes one or more motors configured to move the vehicle using the electrical energy. The inductive charging system includes an electronic control unit that is configured to control at least one of an amount of the electrical energy that is stored in each of the one or more power storage devices or an amount of the electrical energy that is distributed to the one or more motors to move the vehicle.

18 Claims, 5 Drawing Sheets

(56) References Cited

U.S. PATENT DOCUMENTS

| | | |
|---|---|---|
| 9,112,364 B2 | 8/2015 | Partovi |
| 9,135,803 B1 | 9/2015 | Fields et al. |
| 9,327,608 B2 | 5/2016 | Gibbons, Jr. |
| 9,441,603 B2 | 9/2016 | Khan et al. |
| 9,463,707 B2 | 10/2016 | Lewis |
| 9,466,419 B2 | 10/2016 | Boys et al. |
| 9,511,674 B2 | 12/2016 | Keeling et al. |
| 9,533,590 B2 | 1/2017 | Keeling et al. |
| 9,577,440 B2 | 2/2017 | Partovi et al. |
| 9,577,466 B2 | 2/2017 | Ku et al. |
| 9,649,948 B2 | 5/2017 | Bell et al. |
| 2010/0006351 A1* | 1/2010 | Howard ................ B60L 8/003 180/2.2 |
| 2010/0225271 A1* | 9/2010 | Oyobe .................... B60M 1/36 320/108 |
| 2011/0304216 A1* | 12/2011 | Baarman ................ H02J 5/005 307/104 |
| 2013/0037339 A1 | 2/2013 | Hickox |
| 2013/0038276 A1 | 2/2013 | Raedy |
| 2014/0145514 A1 | 5/2014 | Konno et al. |
| 2014/0252813 A1* | 9/2014 | Lee ........................ H02J 17/00 297/180.12 |
| 2014/0327391 A1 | 11/2014 | Niederhauser et al. |
| 2015/0022140 A1* | 1/2015 | Heishi ...................... H02J 7/34 320/101 |
| 2015/0109000 A1 | 4/2015 | Sieber et al. |
| 2015/0246614 A1 | 9/2015 | Dames et al. |
| 2015/0333560 A1 | 11/2015 | Brach et al. |
| 2015/0371771 A1 | 12/2015 | Abu Qahouq |
| 2016/0001662 A1 | 1/2016 | Miller et al. |
| 2016/0114692 A1* | 4/2016 | Tripathi ................ H02J 7/0021 320/109 |
| 2016/0121732 A1 | 5/2016 | Matsumoto et al. |
| 2016/0197512 A1* | 7/2016 | Song ...................... H02J 7/025 307/104 |
| 2016/0318413 A1 | 11/2016 | Roehrl et al. |
| 2016/0325631 A1 | 11/2016 | Lannoije et al. |
| 2016/0380469 A1 | 12/2016 | Lethellier et al. |
| 2017/0028854 A1 | 2/2017 | Lee et al. |
| 2017/0063170 A1* | 3/2017 | Harper .................... H02J 50/90 |
| 2018/0354383 A1* | 12/2018 | Namou ............... B60L 11/1848 |

OTHER PUBLICATIONS

Wireless Charging & How Inductive Chargers Work; PowerbyProxi website; printed date Sep. 12, 2017 (18 pages).

* cited by examiner

MULTI-COIL CHARGING SYSTEM FOR DISTRIBUTED IN-WHEEL MOTORS

BACKGROUND

1. Field

This specification relates to a system and a method for parallel and/or distributed charging of a vehicle.

2. Description of the Related Art

Vehicles, such as electric vehicles (EV) and plug-in hybrid vehicles (PHV), may charge their batteries via inductive charging. Inductive charging, also known as wireless charging, uses an electromagnetic field to transfer electrical energy between a source, such as a charging station, and a device, such as an EV or PHV vehicle, that stores and/or uses the electrical charge. An inductive coil (or "inductive loop") at a power source, such as a charging station, creates a high frequency alternating electromagnetic field by using a power electronics circuit which is transmitted to an inductive coil at the vehicle. Another power electronics circuit converts the power from the electromagnetic field into direct current (DC) to charge a battery and/or run the vehicle. The inductive loop of the charging station is often in a fixed position and the vehicle is placed or positioned on or near the charging station. The corresponding inductive coil of the vehicle, however, may be misaligned with the inductive loop of the charging station which results in a decrease in the efficiency of the transfer of the electrical energy. That is, when the corresponding coil is mis-aligned electrical energy is lost in the transfer of the electrical energy to the corresponding inductive coil.

Accordingly, there is a need for a system and a method to improve the efficiency of wirelessly charging the vehicle.

SUMMARY

In general, one aspect of the subject matter described in this specification is embodied in an inductive charging system. The inductive charging system includes multiple inductive coils for receiving a wireless transferred power. The inductive charging system includes a power electronics circuit that is configured to convert the wireless transferred power to direct current. The inductive charging system includes one or more power storage devices for storing the electrical energy generated by the DC current charging the one or more power storage devices. The inductive charging system includes one or more motors configured to move the vehicle using the electrical energy stored in the one or more power storage devices. The inductive charging system includes an electronic control unit connected to the multiple inductive coils, the one or more power storage devices and the one or more motors. The electronic control unit is configured to control at least one of an amount of the electrical energy that is stored in each of the one or more power storage devices or an amount of the electrical energy that is distributed to the one or more motors to move the vehicle.

These and other embodiments may optionally include one or more of the following features. The one or more power storage devices may include at least one of a plurality of power storage devices or a single power storage device having a plurality of subsets of battery cells. Each inductive coil of the multiple inductive coils receives the wireless transferred power and the power electronics circuit converts the wireless transferred power into electrical energy for a corresponding power storage device or a corresponding subset of battery cells. The multiple inductive coils may be configured to receive the wireless transferred power and the power electronics device may convert the wireless transferred power into DC current that charges and stores the electrical energy in the one or more storage devices in parallel.

The inductive charging system may include a sensor to detect and measure a state of charge of each of the one or more power storage devices. The electronic control unit may be configured to distribute the electrical charge based on the state of charge of each of the one or more power storage devices to control the amount of the electrical energy that is stored in each of the one or more power storage devices.

The multiple inductive coils include a first inductive coil that is positioned in a front-driver side portion of the vehicle, a second inductive coil positioned in a front-passenger side portion of the vehicle, a third inductive coil positioned in a rear driver side portion of the vehicle and a fourth inductive coil positioned in a rear passenger side portion of the vehicle. Each inductive coil may be connected to a corresponding power storage device and a corresponding motor. The electronic control unit may be configured to receive the wireless transferred power from one or more inductive loops based on an efficiency factor of each inductive coil to control the amount of the electrical energy that is stored in each of the one or more power storage devices.

The inductive charging system may include a sensor configured to measure the efficiency factor of each inductive coil. The electronic control unit may be configured to compare the efficiency factor of each inductive coil to the efficiency factor of the other inductive coils when distributing the electrical energy.

In another aspect, the subject matter is embodied in an inductive charging system for a vehicle. The inductive charging system includes multiple inductive coils for receiving wireless transferred power and a power electronic device that converts the wireless transferred power into DC current. The inductive charging system includes a power storage device having multiple subsets of power cells. The power storage device being configured to store the electrical energy by the DC current charging the power storage device. The electronic control unit is connected to the multiple inductive coils and the multiple power storage devices. The electronic control unit is configured to control storage of an amount of the electrical energy.

In another aspect, the subject matter is embodied in a method for inductively charging a vehicle. The method includes obtaining, by a processor and from a sensor, sensor data that indicates an alignment of one or more inductive loops of a charging apparatus. The method includes activating, by the processor, multiple inductive coils based on the sensor data. The method includes obtaining, using multiple inductive coils, a wireless transferred power and converting, using the power electronics circuit, the wireless transferred power into electrical energy. The method includes directing, using the processor, the electrical energy to a first power storage device of multiple power storage devices based on a state of charge of the first power storage device. The method includes storing, in the first power storage device, the electrical energy.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for wirelessly charging a device, such as a vehicle. Particular embodiments of the subject matter described in this specification may be implemented to realize one or more of the following advantages.

An inductive charging system that receives wireless transferred power from a charging station and converts the wireless transferred power into electrical energy for storage in one or more power storage devices, such as a battery. The charging station has inductive loops that transmit the wireless transferred power by generating a magnetic field using an alternating current (AC). The magnetic field may extend to one or more inductive coils of the inductive charging system where a power electronics device converts the wireless transferred power into direct current (DC) that is used to charge and store electrical energy in a power storage device. The inductive charging system has multiple inductive coils. The multiple inductive coils may be configured to be connected to multiple power storage devices, such as batteries, to store the electrical energy for use to move the vehicle. By having multiple inductive coils that are positioned in different locations of the vehicle, the inductive charging system is more efficient in receiving the wireless transferred power and converting the wireless transferred power into electrical energy for storage and/or to power the vehicle when the inductive charging coils are mis-aligned with the inductive loops of the charging station.

Other benefits and advantages include having multiple power storage devices, such as batteries connected to the multiple inductive coils. By having multiple power storage devices, each power storage device may be charged in parallel, and thus, the amount of time to fully charge the vehicle is reduced. Additionally, if one power storage device fails or is empty, the other power storage devices may provide electrical energy to power the vehicle.

Additionally, the inductive charging system may be configured to control the distribution of the electrical charge that is converted. Thus, the inductive charging system is able to control which power storage device is charged so that if one power storage device is fully charged the electrical charge may be diverted to another power storage device that is not fully charged to more efficiently charge the vehicle.

Figure 1:
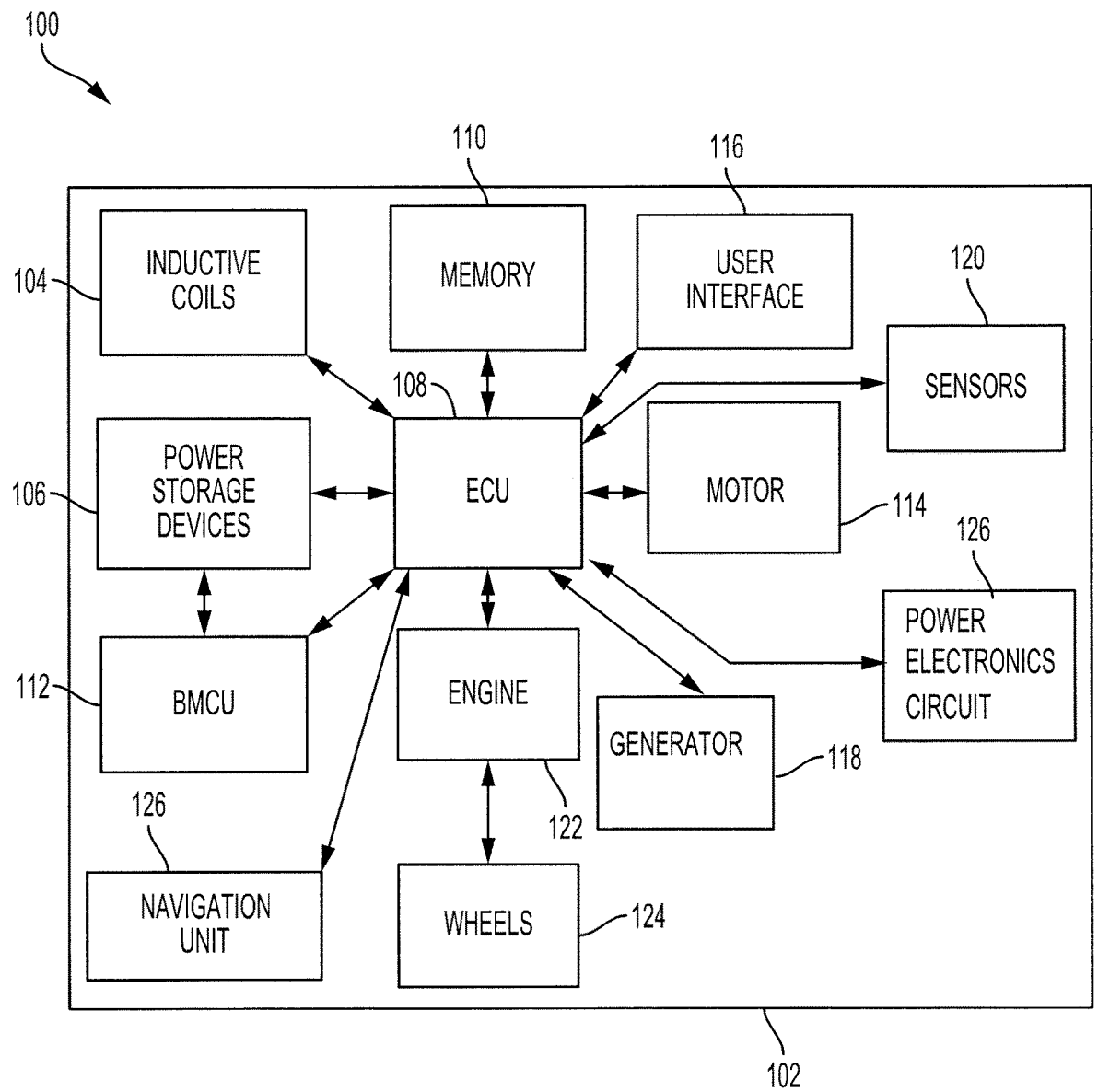
FIG. 1 is a block diagram of an example inductive charging system for a vehicle according to an aspect of the invention.

FIG. 1 is a block diagram of an example inductive charging system 100. The inductive charging system 100 is included within or connected to the vehicle 102 and receives wireless transferred power from a power source, such as a charging station having one or more inductive loops, that transmits the wireless transferred power to the inductive charging system 100 of the vehicle 102.

The inductive charging system 100 includes one or more inductive coils 104, one or more power storage devices 106, a power electronics circuit 126, a computer, a controller or a processor, such as an electronic control unit 108, and a memory 110. The inductive charging system 100 may include a battery management and control unit (BMCU) 112, one or more sensors 120, one or more motors 114 connected to the multiple wheels 124 of the vehicle 102, a user interface 116, a navigation unit 126 and/or a generator 118.

The inductive charging system 100 is included or retrofitted in a vehicle 102. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle (EV), a hybrid vehicle, a plug-in hybrid vehicle (PHV) or any other type of vehicle that includes one or more motors 114 and/or a generator 118. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use the one or more sensors 120 and/or the navigation unit 126 to drive autonomously. The vehicle 102 includes one or more wheels 124. The one or more wheels 124 may be coupled to the engine 122 and/or the one or more motors 114.

The inductive charging system 100 has one or more computers, controllers, processors or electronic control units (ECUs) 108 ("processors"), appropriately programmed, to receive the wireless transferred power and convert the wireless transferred power to electrical energy. The one or more processors may be implemented as a single ECU or in multiple ECUs. The one or more processors may be appropriately programmed to control and/or manage the distribution and/or storage of the electrical energy to and from the one or more power storage devices 106.

The inductive charging system 100 includes a power electronic device 126. The power electronic device 126 converts the transferred power from the one or more inductive coils 104 into DC current to be stored as electrical energy in the one or more power storage devices 106.

The inductive charging system 100 includes one or more inductive coils 104. The one or more inductive coils 104 may be made from electrically conductive wire. The one or more inductive coils 104 may be positioned at different locations of the vehicle 102.

By having multiple inductive coils 104 in different heights, positions on and/or within the vehicle 102, the area covered by the multiple inductive coils 104 of the inductive charging system 100 compensate for mis-alignment between the multiple inductive coils 104 and the inductive loops of the power source that is providing the wireless transferred power. The multiple inductive coils 104 provide a greater probability of aligning and/or positioning the inductive coils 104 on a vehicle 102 with one or more inductive loops of a power source. Each inductive coil of the one or more inductive coils 104 may correspond and connect to a power electronics circuit 126 and an individual power storage device of the one or more power storage devices 106. The power storage devices 106 may be modular and allow for interchangeability, such that if one of the power storage devices is faulty the power storage device is replaceable by one of the other power storage devices 106. Each power storage device may connect and correspond to a motor of the one or more motors 114, and each motor may be connected to and correspond with a wheel of the one or more wheels 124 of the vehicle 102. By having multiple individual motors, the inductive charging system 100 does not require a central transaxle to move the one or more wheels 124 of the vehicle 102. Moreover, the multiple individual motors provide the corresponding wheel more degrees of freedom to rotate and/or move.

Figure 2:
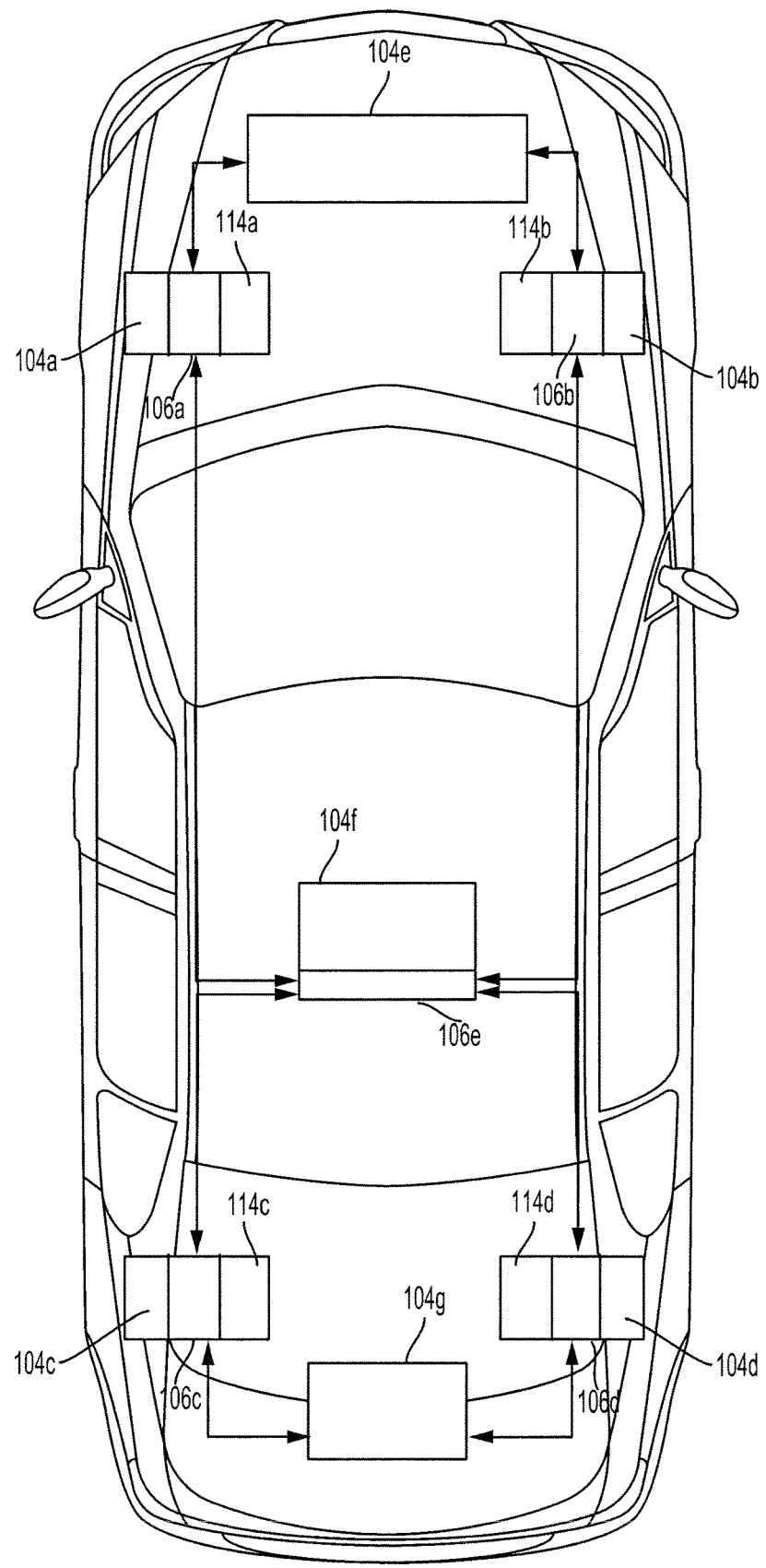
FIG. 2 shows the inductive charging system of FIG. 1 positioned within the vehicle according to an aspect of the invention.

FIG. 2 shows an example configuration of the one or more inductive coils 104 within the vehicle 102. For example, a first inductive coil 104a may be positioned on the front driver-side portion of the vehicle 102, a second inductive coil 104b may be positioned on the front passenger-side portion of the vehicle 102, a third inductive coil 104c may be positioned on the rear driver-side portion of the vehicle 102, and a fourth inductive coil 104d may be positioned on the rear passenger-side portion of the vehicle 102. The first inductive coil 104a may be connected to the motor 114a and the power storage device 106a. The second inductive coil 104b may be connected to the motor 114b and the power storage device 106b. The third inductive coil 104c may be connected to the motor 114c and the power storage device 106c. The fourth inductive coil 104d may be connected to the motor 114 and the power storage device 106d. The power storage devices 106a-e may be a single battery with multiple subsets of power cells or may each be an individual power storage device that is a physically separate device. The power storage devices 106a-e may be electrically interconnected even if each power storage device is a physically separate device. There may be a centralized power storage device 106e that interconnects the different power storage devices 106a-d.

In another example, the inductive charging system 100 may have an inductive coil 104e positioned in the front portion of the vehicle 102, an inductive coil 104f positioned in the center of the vehicle 102, and/or an inductive coil 104g positioned in the rear of the vehicle 102. The one or more inductive coils 104 may be positioned in any combination of positions on or within the vehicle 102.

Figure 3:
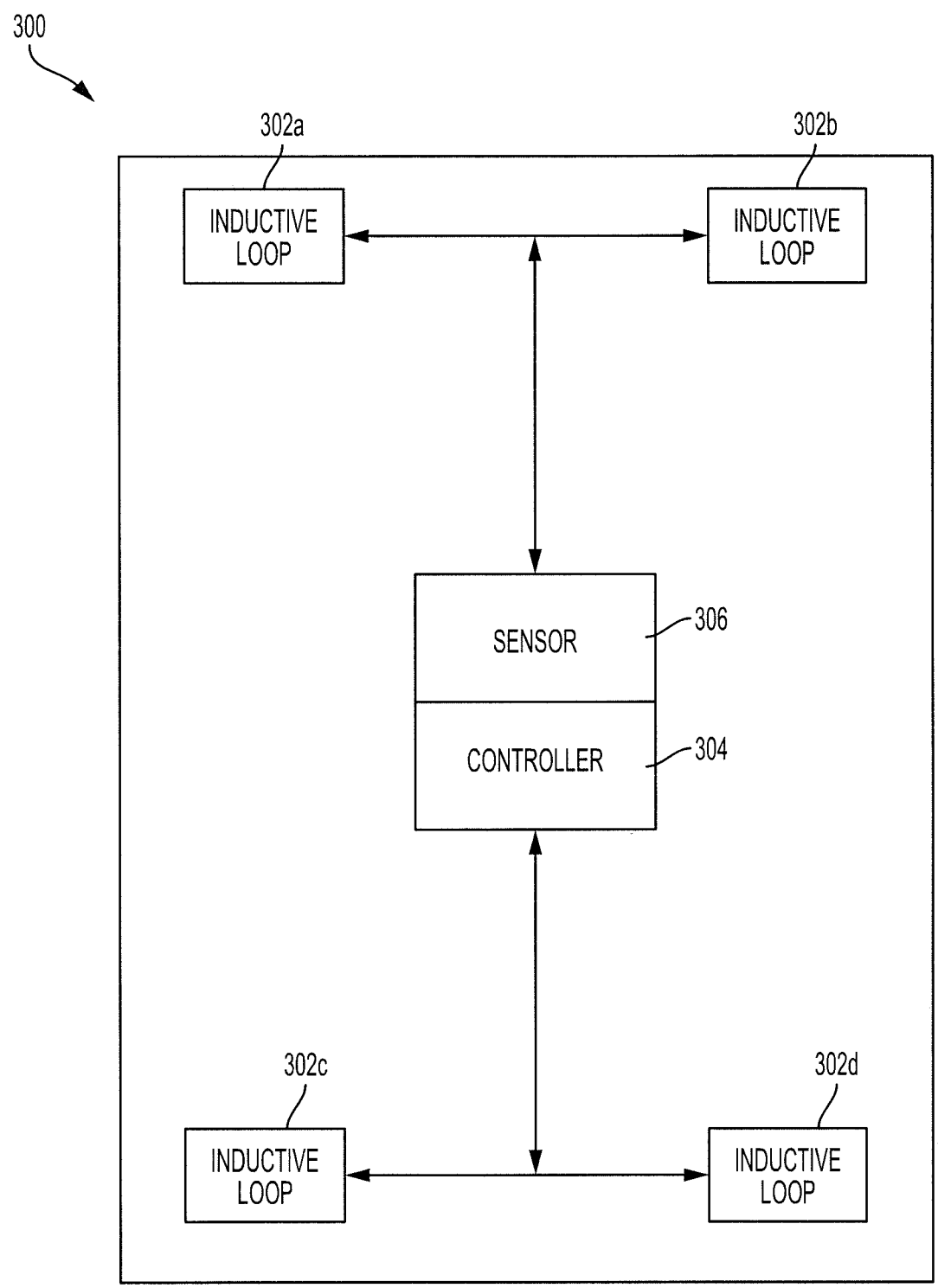
FIG. 3 shows an example power source, such as a charging station or pad, that charges the inductive coils of the inductive charging system of FIG. 1 according to an aspect of the invention.

The one or more inductive coils 104 may receive the wireless transferred power from a power source, such as a charging pad 300 of a charging station as shown in FIG. 3 for example. The one or more inductive coils 104 receive the wireless transferred power and provide the wireless transferred power to a power electronics circuit 126 that converts the wireless transferred power to a DC current where the DC current charges the powerstorage device which stores the electrical energy.

The inductive charging system 100 may have one or more sensors 120. The one or more sensors 120 may include a battery sensor, a charging sensor, a proximity sensor, an alignment sensor and/or a camera.

The battery sensor may measure a state of charge for each of the one or more power storage devices 106 and/or measure a total state of charge for all of the one or more power storage devices 106. The battery sensor may measure an amount of state of charge (SOC) that is remaining, a rate of depletion and/or storage and/or a percentage of capacity of the state of charge of the one or more power storage devices 106. The battery sensor may indicate an operational status, such as operational or non-operational, and/or any faults with a battery.

The one or more sensors 120 may include a charging sensor for each of the one or more inductive coils 104. The charging sensor may measure an efficiency factor for each of the one or more inductive coils 104. For example, the charging sensor may detect that an inductive coil is receiving the wireless transferred power and that the power electronics circuit converts the wireless transferred power at one-third efficiency. The charging sensor may measure or detect an amount of power of the wireless transferred power that is transmitted by the power source and received by the inductive charging system 100. For example, the charging sensor may determine that a front inductive loop of the power source is emitting a stronger wireless transferred power, i.e., the wireless transferred power has a greater power level, than a rear inductive loop of the power source.

The one or more sensors may include a proximity sensor. The proximity sensor may measure or detect a distance from the power source to the vehicle 102 and may be used to activate the inductive charging system 100.

The one or more sensors may include an alignment sensor. The alignment sensor and/or the camera may be used to align the one or more inductive coils 104 with the one or more inductive loops of the power source. The alignment sensor may be an optical sensor that signals when the optical sensor is aligned with a target sensor on the power source. The alignment sensor may indicate a direction to move the vehicle 102 and/or navigate the vehicle 102 to align the alignment sensor with the target sensor. The camera may capture an image of the power source and indicate to the driver and/or navigate the vehicle 102 to align the one or more inductive coils 104 with the inductive loops of the power source.

The inductive charging system 100 may include one or more motors 114 and/or a generator 118. The one or more motors 114 and/or the generator 118 may be an electric motor and an electric generator that converts electrical energy into mechanical power, such as torque, and converts mechanical power into electrical energy. The one or more motors 114 and/or the generator 118 may be coupled to the one or more power storage devices 106. The one or more motors 114 and/or the generator 118 may convert the energy from the power storage devices 106 into mechanical power, and may provide energy back to the power storage devices 106, for example, via regenerative braking. The engine 122 combusts fuel to provide power instead of and/or in addition to the power supplied by the one or more motors 114 and/or the generator 118.

The one or more power storage devices 106 may be coupled to the one or more motors 114 and/or the generator 118 and may provide electrical energy to and receive electrical energy from the one or more motors 114 and/or the generator 118. A power storage device may be a battery or a subset of power cells of the battery. The battery may include one or more rechargeable batteries and/or may be a high-powered battery. The battery may be coupled to the one or more inductive coils 104 and may provide or receive a charge to or from one or more inductive loops of a charging infrastructure. A power storage device may be a subset of multiple power cells.

The BMCU 112 may be coupled to the one or more power storage devices 106. The BMCU 112 may control and manage the charging and discharging of the electrical energy stored in the one or more power storage devices 106. The BMCU 112, for example, may measure, using battery sensors, parameters used to determine the state of charge (SOC) of the one or more power storage devices 106.

The inductive charging system 100 may include a user interface 116. The user interface 116 may provide an interface for input and/or output. The user interface 116 may have user elements. The user interface 116 may receive user input such as the selection of user elements to obtain the one or more configuration settings. The output may, include notifications and/or alerts indicating the initialization or use of the inductive charging system 100.

The inductive charging system 100 may include a memory 110. The memory may be coupled to the ECU 108. The memory 110 may store instructions to execute on the ECU 108 and may include one or more of a RAM (Random Access Memory), other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108.

The inductive charging system 100 may include a navigation unit 126 which may be coupled to the ECU 108 and provide vehicle information and/or navigational map information to the ECU 108. The navigation unit 126 may have or be connected to a Global Positioning System (GPS) device. The vehicle information may include the current position, location, direction of travel and/or speed of the vehicle 102. The navigational map information may include a location of one or more power sources, such as one or more charging stations.

FIG. 3 shows a power source, such as a charging pad 300 of a charging station. The charging pad 300 has one or more inductive loops including a multiple inductive loops 302a-d, a sensor 306 and a controller 304. The charging pad 300 may be positioned below the vehicle 102 to charge the vehicle 102. The controller 304 may control the one or more inductive loops 302a-d and position the one or more inductive loops 302a-d to more efficiently transfer the wireless transferred power to the one or more inductive coils 104. The controller 304 may use the sensor 306 to align the one or more inductive loops 302a-d with the one or more inductive coils 104. The sensor 306 may be a target sensor that aligns with an optical sensor of the inductive charging system 100.

Figure 4:
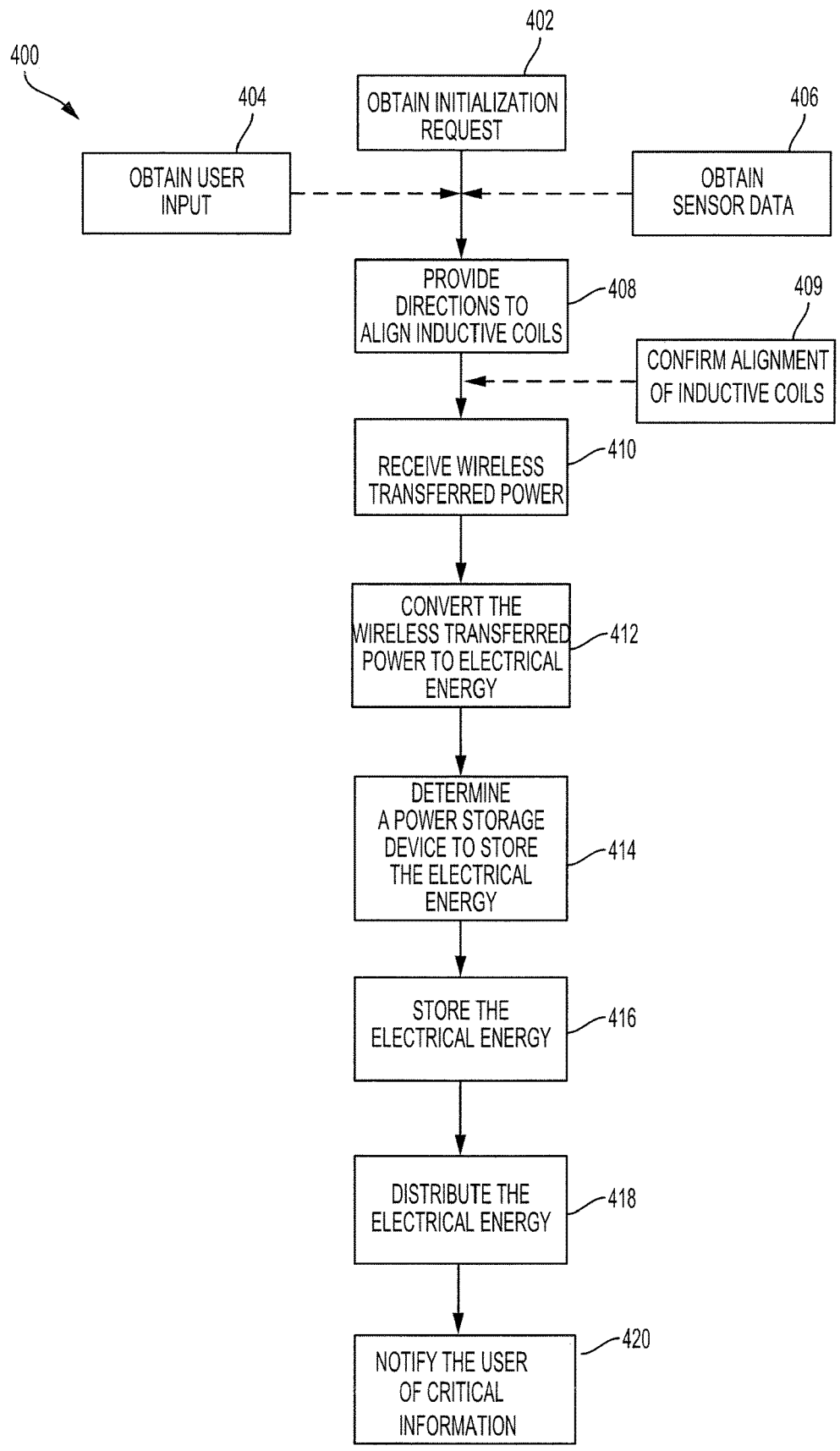
FIG. 4 is a flow diagram of an example process of operating the inductive charging system of FIG. 1 to charge the vehicle according to an aspect of the invention.

FIG. 4 is a flow diagram of a process 400 for wirelessly charging the vehicle 102. One or more computers or one or more data processing apparatuses, for example, the one or more processors or the one or more ECUs 108 of the inductive charging system 100 of FIG. 1, appropriately programmed, may implement the process 400.

The inductive charging system 100 may obtain an initialization request (402). The inductive charging system 100 may receive the initialization request when a user activates the inductive charging system 100, e.g., when the vehicle 102 is turned on or activates the inductive charging system 100 from the user interface 116 to charge the vehicle 102. The inductive charging system 100 may receive the initialization request from one or more sensors 120. For example, when an EV and/or PHV vehicle is within a threshold distance of the charging station, a proximity sensor and/or an alignment sensor may detect the charging station and initialize the inductive charging system 100. In another example, the inductive charging system 100 may obtain navigational map and vehicle information from the navigation unit 126 and compare the location of the vehicle 102 relative to the location of the power source to determine if the location of the vehicle 102 is within a threshold distance of the location of the power source. If the relative distance is less than the threshold distance, the inductive charging system 100 may activate.

The inductive charging system 100 may obtain user input including one or more configuration settings (404). The inductive charging system 100 may receive the user input from the user interface 116, such as a user selection of a user element that activates an inductive coil. In some implementations, the initialization request may include the user input of the one or more configuration settings. The one or more configuration settings may indicate which one of the one or more inductive coils 104 to activate to receive the wireless transferred power transmitted by the one or more inductive loops of the power source. For example, the one or more configuration settings may activate the front inductor coil 104e and the back inductor coil 104g but none of the other inductive coils 104a-d positioned near the wheels of the vehicle 102. In some implementations, the inductive charging system 100 may have a default setting for the one or more configuration settings, e.g., a configuration setting where all of the one or more inductive coils 104 are activated to receive the wireless transferred power.

The inductive charging system 100 may obtain sensor data that indicates a position and/or location of the one or more inductive coils 104 relative to the one or more inductive loops 302a-d of the power source (406). The sensor data may include an image and/or alignment data. The inductive charging system 100 may capture, using a camera, the image of one or more locations in proximity to the one or more inductive coils 104 that may be included in the sensor data. In some implementations, the inductive charging system 100 uses an alignment sensor, such as an optical sensor, to determine alignment data including a relative location from the alignment sensor positioned on the vehicle 102, e.g., on or near an inductive coil, to a target sensor positioned on the power device, e.g., on or near an inductive loop. In some implementations, the inductive charging system 100 determines and or obtains sensor data including a strength of the wireless transferred power emitted and/or transmitted by each of the one or more inductive loops of the power source using a sensor, such as a charging sensor.

The inductive charging system 100 may provide directions to the user to align the one or more inductive coils 104 with the one or more inductive loops of the power source (408). The inductive charging system 100 may provide the directions through the user interface 116, such as through a display or speaker. The directions may be based on the sensor data including a relative position, location and/or direction of the inductive coils 104 and the inductive loops, a strength of the wireless transferred power or a combination or weighted combination of both. For example, the inductive charging system 100 may direct the user to move the vehicle 102 forward/backward and/or to the right/left to align the one or more inductive coils 104 with the one or more inductive loops to more efficiently receive the wireless transferred power. In another example, the inductive charging system 100 may direct the user to align a majority of the one or more inductive coils to a front inductive loop of the power source if the front inductive loop is emitting a stronger wireless transferred power than the rear inductive loop. The directions may be based on the one or more configuration settings. The inductive charging system 100 may direct the user to align the vehicle 102 with the power source such that the active inductive coils are positioned or aligned with the inductive loops of the power source. The inductive charging system 100 may confirm the alignment of the inductive coils 104 with the inductive loops (409). The confirmation may be based on image data captured by the camera, e.g., by capturing an image of the one or more inductive loops beneath the inductive coils 104 and determining that the locations and/or positions are within a threshold distance of each other, or sensor data, such as an indication when an optical sensor aligns with a target sensor.

The inductive charging system 100 activates and receives the wireless transferred power from the power source (410). The inductive charging system 100 may activate the one or more inductive coils 104 based on the sensor data and/or one or more configuration settings. The inductive charging system 100 may determine whether each of the one or more inductive coils is aligned with or within a threshold distance of an inductive loop based on the sensor data and activate the one or more inductive coils that are aligned or within the threshold distance to improve the efficiency of receiving the wireless transferred power. The inductive charging system 100 may only activate the one or more inductive coils 104 if the inductive coil is of a particular efficiency or has an efficiency factor greater than equal to a threshold value. For example, the inductive charging system 100 may activate the inductive coil if the inductive coil is able to receive and convert at least 80% of the wireless transferred power directed at the inductive coil from the corresponding inductive loop. By assisting the alignment of the inductive coils with the inductive loops of the power source, the inductive charging system 100 may achieve peak efficiency of capturing the wireless transferred power, e.g., an efficiency rate of approximately 80%-90%.

In some implementations, the inductive charging system 100 activates the one or more inductive coils 104 based on the one or more configuration settings. The inductive charging system 100 may activate only the one or more inductive coils 104 that the one or more configuration settings indicate should be activated.

In response to receiving the wireless transferred power from the power source, the inductive charging system 100 converts the wireless transferred power to a DC current that charges the power storage device with electrical energy (412). The wireless transferred power may be a magnetic field created or generated by alternating current (AC) within the one or more inductive loops of the power source. The magnetic field may generate current within the one or more inductive coils 104 of the inductive charging system 100 when the one or more inductive coils 104 are within a threshold distance of the one or more inductive loops. The one or more inductive coils 104 may provide the wireless transferred power to a power electronics circuit 126 that converts the wireless transferred power to a direct current (DC) which charges the one or more power storage devices 106, such as a battery, to store electrical energy in the one or more power storage devices 106.

Figure 5:
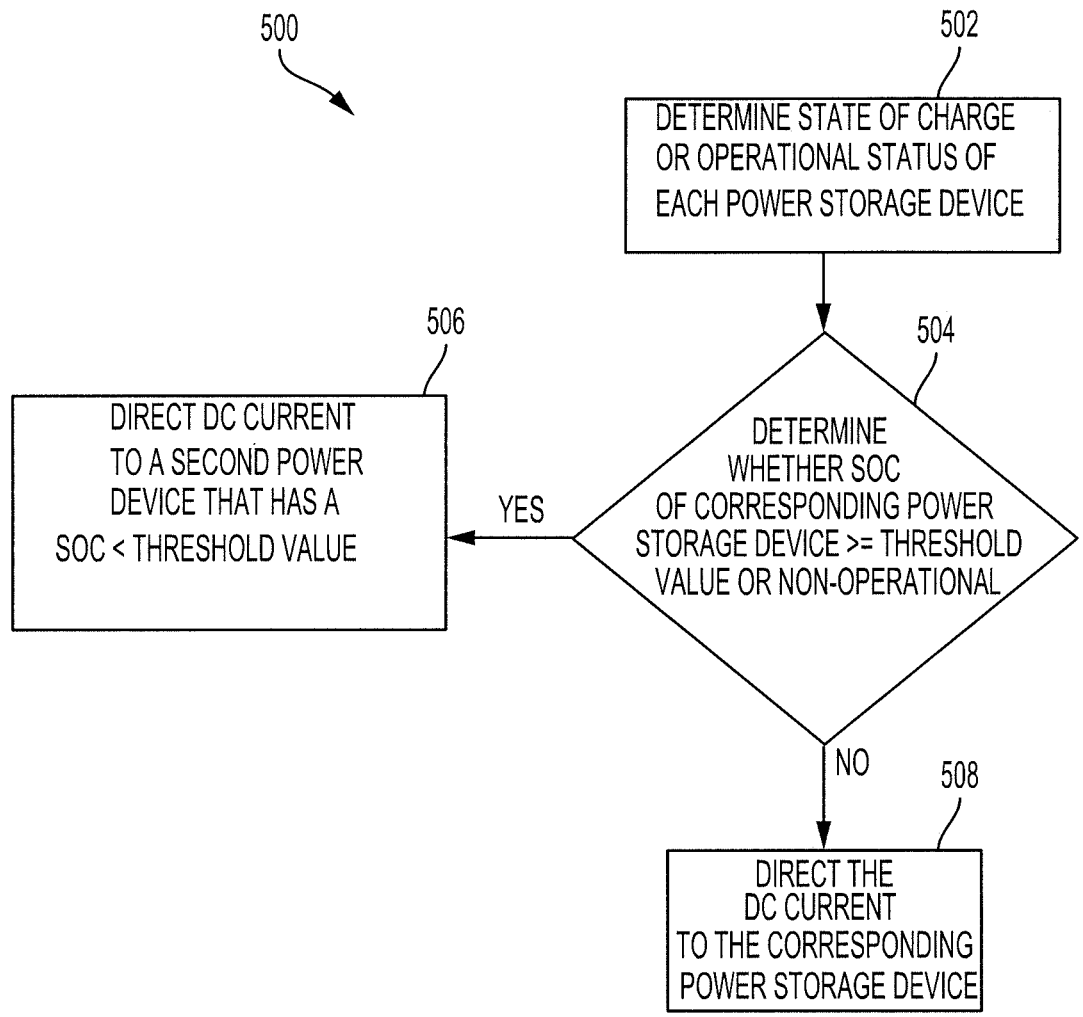
FIG. 5 is a flow diagram of an example process for determining the power storage device that receives the electrical energy generated by the inductive charging system of FIG. 1 according to an aspect of the invention.

When the wireless transferred power is converted into electrical energy, the inductive charging system 100 may determine which power storage device of the one or more power storage devices 106 to store the electrical energy (414). Each inductive coil of the one or more inductive coils 104 may correspond to a particular power storage device, such that a first inductive coil provides the wireless transferred power to a power electronics circuit that provides a DC current that charges a first power storage device, while another inductive coil, such as a second inductive coil that provides the wireless transferred power to a power electronics circuit that provides a DC current that charges another power storage device, such as a second power storage device. In some implementations, an inductive coil of the one or more inductive coils 104 provides the wireless transferred power to a power electronics circuit that provides a DC current that charges a different power storage device than the corresponding power storage device. FIG. 5 describes the control of the electrical energy generated by the one or more inductive coils 104 into the one or more power storage devices 106.

The inductive charging system 100 may store the electrical energy converted in one or more power storage devices 106 (416). The one or more power storage devices 106 may be a single device, such as a battery, that has multiple power cells where each power cell of the multiple power cells is connected to a corresponding inductive coil that charges the power cell. For example, the battery may have multiple powers cells that are divided into a first subset of power cells and a second subset of power cells. A front inductive coil may charge the first subset of power cells and a rear inductive coil may charge the second subset of power cells. In some implementations, the one or more power storage devices are individual and separate power storage devices, such as separate batteries, that are electrically interconnected to allow an electrical charge to flow among the separate but electrically interconnected batteries.

By having multiple power storage devices and multiple inductive coils 104, the inductive charging system 100 charges the vehicle 102 in parallel and/or in a distributed manner. When the inductive charging system 100 charges the vehicle 102 in parallel, each power storage device is charged simultaneously with the other power storage devices. This increases the efficiency and rate at which the power storage devices become fully charged. When the inductive charging system 100 uses distributed charging to charge the vehicle 102, the inductive charging system 100 may redirect electrical energy from a first power storage device to a second power storage device, when the first power storage device is fully charged, is greater than or equal to a threshold and/or otherwise is unable to charge the first power storage device. This increases the efficiency of the inductive charging system 100 by redirecting the electrical energy from the one or more power storage devices 106 that are unable to further store the electrical charge to a power storage device that is able to store the electrical charge. The inductive charging system 100 may distribute the electrical energy to one or more motors to move the one or more wheels of the vehicle 102 (418). Multiple motors provide more degrees of freedom for each of the one or more wheels of the vehicle 102.

The inductive charging system 100 may notify the user through the user interface 116 of critical information (420). The critical information may include the initialization of the inductive charging system 100, failure or non-operational status of one or more of the power storage devices 106 and/or a state of charge of the one or more power storage devices 106. Other critical information may include the positioning of the one or more inductive coils 104 relative to the one or more inductive loops of a power source.

FIG. 5 is a flow diagram of an example process 400 for determining the power storage device to store the charge from the one or more inductive coils 104 of the inductive charging system 100. One or more computers or one or more data processing apparatuses, for example, the one or more processors or the one or more ECUs 108 of the inductive charging system 100 of FIG. 1, appropriately programmed, may implement the process 500.

The inductive charging system 100 may direct the converted DC current from the inductive coil and power electronics device to the corresponding power storage device and/or direct the converted DC current to another power storage device, e.g., because the corresponding power storage device may be fully charged or above a threshold amount and/or is non-operational. The inductive charging system 100 may implement the process 500 to determine which power storage device to charge.

The inductive charging system 100 may determine a state of the charge for each of the one or power storage devices 106 and/or an operational status of the one or more power storage devices 106, e.g., using a battery sensor (502). The inductive charging system 100 may determine whether the corresponding power storage device is non-operational or has a state of charge that is greater than or equal to the threshold charge, such as 99% of total charge capacity (504). If the corresponding power storage device is non-operational or has a state of charge greater than or equal to the threshold charge, the inductive charging system 100 may direct the DC current to a power storage device of the one or more power storage devices that is not fully charged and/or is below a threshold charge and is operational (506). In some implementations, the inductive charging system 100 may direct the DC current to the one or more motors 114 to move the vehicle or to a power storage device that has the least amount of stored electrical energy. Otherwise, the inductive charging system 100 may direct the DC current to the corresponding power storage device (508).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An inductive charging system for a vehicle, comprising:
   a plurality of inductive coils including a first inductive coil and a second inductive coil and being configured to receive a wireless transferred power;
   a power electronics circuit configured to convert the wireless transferred power to direct current (DC);
   a plurality of power storage devices including a first power storage device and a second power storage device and being configured to store electrical energy by charging the plurality of power storage devices using the DC current;
   a plurality of motors including a first motor that is connected to the first inductive coil and the first power storage device, and a second motor that is connected to the second inductive coil and the second power storage device, the plurality of motors being configured to move wheels of the vehicle using the electrical energy stored in the plurality of power storage devices; and
   an electronic control unit connected to the plurality of inductive coils, the plurality of power storage devices and the plurality of motors, and configured to:
   determine a power storage device among the plurality of power storage devices that has a least amount of stored electrical energy;
   provide the DC current to the power storage device among the plurality of power storage devices that has the least amount of stored electrical energy; and
   control an amount of the electrical energy that is distributed to the plurality of motors to move the wheels of the vehicle.

2. The inductive charging system of claim 1, wherein each inductive coil of the plurality of inductive coils receives the wireless transferred power and the power electronics circuit converts the wireless transferred power into electrical energy for a corresponding power storage device of the plurality of power storage devices.

3. The inductive charging system of claim 1, wherein the plurality of inductive coils are configured to receive the wireless transferred power and the power electronics circuit converts the wireless transferred power into DC current that charges the plurality of power storage devices in parallel.

4. The inductive charging system of claim 1, further comprising:
   a sensor to detect and measure a state of charge of each of the plurality of power storage devices, wherein the electronic control unit is configured to determine the power storage device that has the least amount of stored electrical energy distribute the electrical based on the state of charge of each of the plurality of power storage devices.

5. The inductive charging system of claim 1, wherein the plurality of inductive coils further includes a third inductive coil that is positioned in a rear driver side portion of the vehicle and a fourth inductive coil that is positioned in a rear passenger side portion of the vehicle, wherein the first inductive coil is positioned in a front driver side portion of the vehicle and the second inductive coil is positioned in a front passenger side portion of the vehicle.

6. The inductive charging system of claim 1, wherein the first motor connects and corresponds with a first wheel to move the first wheel and the second motor connects and corresponds with a second wheel to move the second wheel.

7. The inductive charging system of claim 1, further comprising:
   a sensor that is configured to detect a relative position of one or more inductive loops of a charging pad in relation to the plurality of inductive coils;
   wherein the electronic control unit is configured to control an amount of the wireless transferred power received by each inductive coil of the plurality of inductive coils based on the relative position of the one or more inductive loops of the charging pad.

8. The inductive charging system of claim 1, wherein the electronic control unit is further configured to:
   obtain one or more configuration settings that indicate one or more inductive coils of the plurality of inductive coils to activate; and
   activate the one or more inductive coils based on the one or more configuration settings.

9. The inductive charging system of claim 1, wherein the electronic control unit is configured to receive the wireless transferred power from one or more inductive loops based on an efficiency factor of each inductive coil of the plurality of inductive coils.

10. The inductive charging system of claim 9, further comprising:
    a sensor configured to measure the efficiency factor of each inductive coil of the plurality of inductive coils;
    wherein the electronic control unit is further configured to compare the efficiency factor of each inductive coil to the efficiency factor of the other inductive coils.

11. An inductive charging system for a vehicle, comprising:
- a plurality of inductive coils including a first inductive coil and a second inductive coil and being configured to receive a wireless transferred power;
- a power electronics circuit that converts the wireless transferred power into direct current (DC);
- a plurality of power storage devices including a first power storage device and a second storage device and being configured to store electrical energy;
- a plurality of motors including a first motor that is connected to the first inductive coil and the first power storage device, and a second motor that is connected to the second inductive coil and the second power storage device, the plurality of motors being configured to move wheels of the vehicle; and
- a processor connected to the plurality of inductive coils, the plurality of power storage devices, and the plurality of motors and configured to:
- determine that the first power storage device has a least amount of stored electrical energy;
- provide the DC current to the first power storage device in response to the first power storage device having the least amount of stored electrical energy; and
- control an amount of the electrical energy that is distributed to the plurality of motors to move the wheels of the vehicle.

12. The inductive charging system of claim 11, wherein the processor is configured to:
- distribute power from a power storage device of the plurality of power storage devices to a corresponding motor of the plurality of motors; and
- operate the corresponding motor using the distributed power.

13. The inductive charging system of claim 11, further comprising:
- a sensor to detect and measure a state of charge of each of the plurality of power storage devices, wherein the processor is configured to determine the power storage device that has the least amount of stored electrical energy based on the state of charge of each of the plurality of power storage devices.

14. A method for inductively charging a vehicle, the method being performed by a processor connected to a plurality of inductive coils, a plurality of power storage devices, and a plurality of motors, the method, comprising:
- obtaining, by the processor and from a sensor, sensor data that indicates an alignment of one or more inductive loops of a charging apparatus;
- activating, by the processor, the plurality of inductive coils including a first inductive coil and a second inductive coil based on the sensor data;
- obtaining, using the plurality of inductive coils, a wireless transferred power;
- converting, by a power electronics circuit, the wireless transferred power into electrical energy;
- determining, by the processor, that a first power storage device among the plurality of power storage device has a least amount of stored electrical energy;
- directing, by the processor, the electrical energy to the first power storage device of the plurality of power storage devices based on the determination;
- storing, in the first power storage device, the electrical energy;
- directing, by the processor, the electrical energy from the first power storage device to a first motor of the plurality of motors, the plurality of motors being configured to move wheels of the vehicle;
- directing, by the processor, the electrical energy to a second power storage device of the plurality of power storage devices; and
- directing, by the processor, the electrical energy from the second power storage device to a second motor of the plurality of motors to move the wheels of the vehicle.

15. The method of claim 14, further comprising:
- directing, by the processor, the electrical energy from each power storage device to a corresponding motor of the plurality of motors to move a corresponding wheel of the vehicle.

16. The method of claim 14, wherein further comprising:
- measuring a state of charge of each of the plurality of power storage devices, wherein determining that the first power storage device has the least amount of stored electrical energy is based on the state of charge of each of the plurality of power storage devices.

17. The method of claim 14, wherein directing the electrical energy to the first power storage device and the second power storage device includes directing, by the processor, the electrical energy to the first power storage device and the second power storage device simultaneously.

18. The inductive charging system of claim 11, wherein the processor is configured to direct the DC current to the corresponding power storage device when no power storage device has the least amount of stored electrical energy.

* * * * *